Nov. 24, 1925.

E. A. HUTCHINSON
POWER LIFT FOR PLOWS
Filed April 27, 1923

INVENTOR
E.A.HUTCHINSON
By Fetherston Laugh & Co
Attys.

Nov. 24, 1925.

E. A. HUTCHINSON

POWER LIFT FOR PLOWS

Filed April 27, 1923   2 Sheets-Sheet 2

1,562,966

INVENTOR
E. A. HUTCHINSON
By Fetherstonhaugh & Co
Attys.

Patented Nov. 24, 1925.

1,562,966

UNITED STATES PATENT OFFICE.

EDWARD ARTHUR HUTCHINSON, OF BRANTFORD, ONTARIO, CANADA, ASSIGNOR TO COCKSHUTT PLOW COMPANY, LIMITED, OF BRANTFORD, ONTARIO, CANADA, A CORPORATION OF CANADA.

POWER LIFT FOR PLOWS.

Application filed April 27, 1923. Serial No. 635,098.

*To all whom it may concern:*

Be it known that I, EDWARD ARTHUR HUTCHINSON, a subject of the King of Great Britain, and a resident of the city of Brantford, in the county of Brant, in the Province of Ontario, Canada, have invented certain new and useful Improvements in Power Lifts for Plows, of which the following is the specification.

My invention relates to improvements in power lifts for plows and the object of the invention is to devise coacting means on the land wheel axle and hub whereby the plow frame can be elevated by power to lift the plow bottoms out of the land where this is desirable, such as in backing up, where the plow bottoms strike an obstruction, or where it is desired to pick up a piece of irregular plowing.

A further object is to devise a power mechanism for lifting the plow frame in which the weight of the plow frame and plow bottoms is utilized to restore the frame from the elevated to the cutting position.

A still further object is to devise a plow frame power lifting means which is enclosed and the whole assembly mounted on the land wheel axle and hub, thus doing away with a considerable number of movable parts that would otherwise be necessary.

Another object is to devise manually controlled means whereby the power lifting mechanism can be thrown into its functioning position by the operator while seated on the tractor seat, and yet another object is to devise means whereby the ordinary manually operated lever controlled frame lifting means is interconnected with the power lifting means, thus obviating the construction of two distinct and separate lifting mechanisms.

My invention consists of a power lift for plows constructed and arranged all as hereinafter more particularly described and illustrated in the accompanying drawing in which.

Like characters of reference indicate corresponding parts in the different views.

Figure 1:
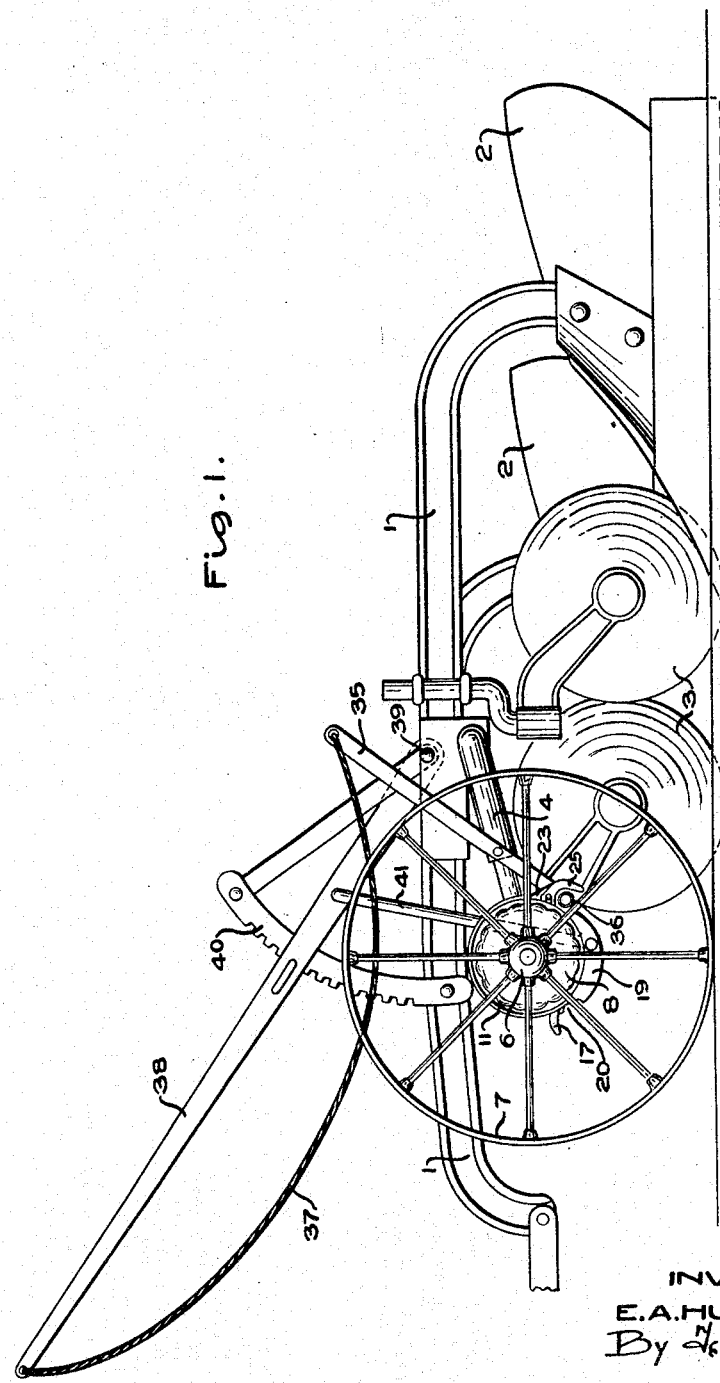
Fig. 1 represents a side elevation of a plow showing my power lifting mechanism applied to the land wheel hub and axle.

1 is a plow frame. 2 are the plow bottoms mounted thereon in the usual manner. 3 are the disc cutters. 4 is the cranked land wheel axle pivotally connected to the plow frame and having the laterally extending free end 5 upon which the hub 6 of the land wheel 7 is freely mounted in the usual manner. 8 is an inwardly extending annular casing formed on or secured to the hub 6 and its inner periphery is provided with a series of substantially semicircular transverse indentures 9.

10 is an annular pawl supporting member provided with the outwardly extending peripheral flange 11 adapted to extend over the inner edge of the casing 8 when it is applied to the annular member 10, said annular pawl supporting member 10 being provided with an outwardly extending boss 12, by means of which it is freely mounted on the axle end 5 of the cranked axle 4. 13 is a slide receiving orifice extending through the flange 11.

14 is a pawl member pivoted on the outside face of the pawl supporting member 10 and having an arm extension 15 upon which is journalled the roller 16. 17 is a pawl extension on the pawl member 14 adapted to extend out through the orifice 18 in the flange 11.

The pawl supporting member 10 is provided with an eccentrically disposed external web 19 having an indenture 20 therein in the vicinity of one end.

21 is a laterally extending slide slidably mounted on the outer face of the pawl supporting member 10 and extending through the orifice 13, said slide being held in position by means of the pin 22 which extends laterally from the bracket 23 on the pawl supporting member 10, said pin extending through the longitudinal slot 24 in the slide. The slide 21 has a downwardly curved arm 25 positioned exteriorly of the member 10, and also a longitudinal slot 26 adapted to receive the spiral spring 27 which is connected at one end to the pin 28 on the slide 21 and at the other end to the pin 29 which extends freely through a further longitudinal slot 30 in the slide and is mounted on the pawl supporting member 10. 31 is an offset extension on the pawl member 14 adapted to coact with the end 32 on the slide 21. 33 is a spiral spring connected at one end to the pin 34 on the pawl member 14 and at the other end to the aforesaid pin 29 on the pawl supporting member 10.

35 is an actuating lever pivoted on the crank portion of the cranked axle 4 and its lower end carrying the roller 36 normally adapted to engage the edge of the web 19, said lever 35 being connected by a flexible connection 37 with the end of the plow frame lifting lever 38, which is pivoted on the frame 1 by means of the lug 39, said lever coacting with a quadrant 40 whereby it is held in any adjusted position in the usual manner.

41 is a connecting rod pivotally connected at its upper end to the lever 38 intermediately of its length and pivotally connected at its lower end to the web 19.

The bracket 23 is provided with a face 42 adapted to engage the roller 36 when the mechanism is in the inoperative position, thus preventing retrograde rotation of the pawl carrying member 10.

Figure 2:
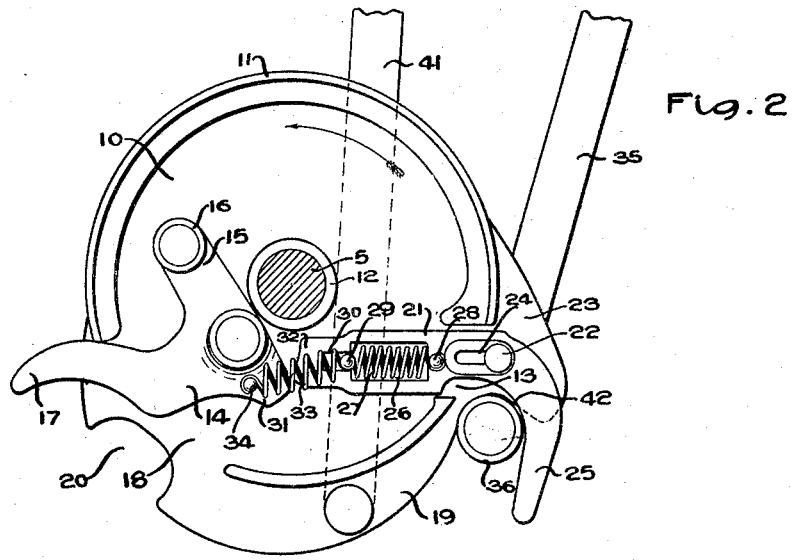
Fig. 2 is a vertical cross sectional view through the axle, looking away from one of the land wheels, showing the portion of my mechanism applied to the axle, and also illustrating such mechanism in the inoperative position.
Figure 4:
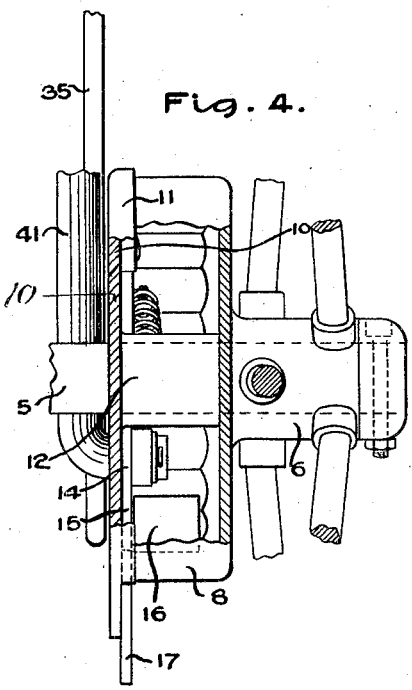
Fig. 4 is an elevational detail of one of the land wheel hubs and axle, showing my power lifting mechanism applied thereto, the casing of the portion of the mechanism applied to the hub being shown broken away.
Figure 3:
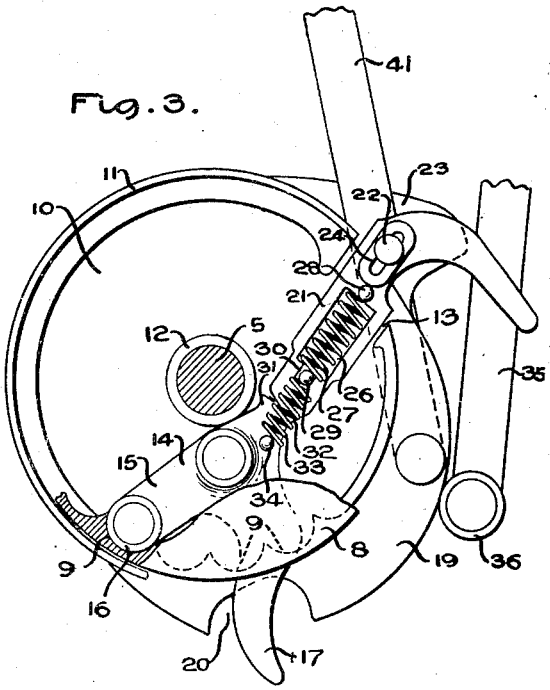
Fig. 3 is a similar view to Figure 2 showing the mechanism during the functioning position.

The operation of my device is as follows:
When the plow bottoms are in the cutting position as illustrated in Figure 1, my power lift is in the inoperative position illustrated in Figure 2 and when it is desired to lift the frame and attached plow bottoms for any reason, the operator pulls on the flexible connection 37 which pulls forwardly the upper end of the lever 35 with the consequent rearward movement of the lower end of such lever so that the roller 36 engages the arm 25 and pulls rearwardly the slide 21. When this occurs the side edge of the inner end 32 of the slide is disengaged from the side edge of the offset extension 31 on the pawl member 14, thus permitting the pawl member 14 to swing into the position illustrated in Figure 3 under the influence of the partially extended spring 33 wherein the inner edge of the inner end 32 of the slide engages the corresponding edge of the extension 31. When the pawl member 14 is swung into such position the roller 16 on the arm 15 is thrown into engagement with one of the semicircular indentures on the inner peripheral face of the casing 8, thus constituting a driving connection between the rotating casing and the supporting pawl carrying member 10. Consequently the pawl carrying member 10 will be rotated in the direction indicated by the arrow in Figure 2 and as such pawl carrying member 10 is connected by means of the rod 41 with the lever 38, which is fixed in position on the frame, the rotation of such member will elevate the frame through the medium of the lever 38 until the roller 36 of the lever 35 enters the indenture 20 in the web 19. As the roller 36 enters the indenture it pushes on the pawl 17, consequently upsetting the pawl member 14 from the position illustrated in Figure 3 into the initial position illustrated in Figure 2. The rearwardly moved slide 21 which has had the inner edge of its end 32 in engagement with the outer face of the extension 31 when the mechanism has been in the position illustrated in Figure 3, is disengaged therefrom, permitting such slide to move forwardly under the influence of the extended spring 27 wherein the side edge of its inner end 32 will again engage the side face of such offset extension 31.

To release the plow frame from the elevated position the lever 35 is again actuated by means of the flexible connection 37 and when its lower end is moved rearwardly the roller 36 will be disengaged from the indenture 20. The weight of the frame and plow acting downwardly on the rod 41 will now restore the pawl carrying member 10 to the initial position illustrated in Figure 2, it, of course, being understood that the roller 16 has been disengaged from the indenture 9 in the casing 8 when the pawl member 14 has been restored to its initial position as above described. The plow will now be in the cutting position again.

Where it is desired to vary the depth of cut, the lever 38 is adjusted on the quadrant 40 which will move the frame up or down, the upper end of the rod 41 acting as the fulcrum about which the lever is swung.

From the above description it will be seen that I have devised a simple and effective power lifting mechanism for plows which will elevate the frame as desired where it is not possible to do this by the usual manual means.

What I claim as my invention is:

1. In a power lift for plows, the combination with the plow frame, land wheel axle, and land wheel thereon, of an annular pawl supporting member, an inwardly extending annular casing secured to the hub of the land wheel and provided with transverse indentures, a pawl pivoted on the pawl supporting member and provided with a roller at one end designed to engage with the indentures, a slide supported in suitable guides on the pawl supporting member and spring-held so as to engage with the pawl, means for withdrawing the end of the slide from engagement with the pawl and yet moving the pawl so that the roller on the end thereof engages with the transverse indentures and causes the supporting member to swing, means for retaining the pawl supporting member in position at the end of its swing and means for releasing the pawl supporting member when desired.

2. In a power lift for plows, the combination with the plow frame, land wheel axle, and land wheel thereon, of an annular pawl supporting member provided with an eccentric offset having a recess in its edge and loose on the axle, an inwardly extending annular casing secured to the hub of the land wheel and provided with transverse indentures, a pawl pivoted on the pawl supporting member and provided with a roller at one end designed to engage with the indentures and a tail at the opposite end, a slide supported in suitable guides on the pawl supporting member provided with a tail at the outer end and having a recess, a spring located in said recess, a spring connecting the pawl to the pawl supporting member, an operating lever suitably pivoted and provided at its lower end with a roller to engage with the tail of the slide to throw the pawl into engagement to cause the pawl supporting member to swing and carry the roller into the recess in the eccentric portion of the pawl supporting member to hold the supporting member from further movement, and at the same time engage with the tail of the pawl to throw out the pawl roller, the said lever being designed to be thrown out of the recess to restore the parts to normal.

3. In a power lift for plows, the combination with the axle and land wheel rotatably mounted thereon, a pawl carrying member freely mounted on the axle, a pawl member pivoted on the pawl carrying member, a casing secured to the land wheel and coacting with the pawl carrying member, clutch means on the pawl member for engaging the inner peripheral surface of the casing, a slide on the pawl carrying member normally engaging the pawl member and holding it in the inoperative position, means for moving the slide outwardly, and means for upsetting the pawl member, on the slide moving outwardly whereby the clutch means thereon engages the inner peripheral surface of the casing.

4. In a power lift for plows, the combination with the axle, and land wheel rotatably mounted thereon, a pawl carrying member freely mounted on the axle, a pawl member pivoted on the pawl carrying member, a casing secured to the land wheel and coacting with the pawl carrying member, clutch means on the pawl member for engaging the inner peripheral surface of the casing, a slide on the pawl carrying member normally engaging the pawl member and holding it in the inoperative position, means for moving the slide outwardly, means for upsetting the pawl member, on the slide moving outwardly whereby the clutch means thereon engages the inner peripheral surface of the casing, and means for restoring the pawl member to its initial position with the consequent disengagement of the clutch means thereon from the casing.

5. In a power lift for plows, the combination with the axle and land wheel rotatably mounted thereon, a pawl carrying member freely mounted on the axle, a pawl member pivoted on the pawl carrying member, a casing secured to the land wheel and coacting with the pawl carrying member, clutch means on the pawl member for engaging the inner peripheral surface of the casing, said pawl member having an offset extension, a slide mounted on the pawl carrying member and normally springheld in its innermost position with the side edge of its inner end in engagement with the side edge of the offset extension on the pawl member, means for moving the slide outwardly, resilient means for swinging the pawl member into such position that the clutch means thereon engages the inner peripheral surface of the casing upon the disengagement of the side edge of the inner end of the slide from the side edge of the offset extension, the end face of the offset extension then engaging the inner end of the slide.

6. In a power lift for plows, the combination with the axle and land wheel rotatably mounted thereon, a pawl carrying member freely mounted on the axle, a pawl member pivoted on the pawl carrying member, a casing secured to the land wheel and coacting with the pawl carrying member, clutch means on the pawl member for engaging the inner peripheral surface of the casing, said pawl member having an offset extension, a slide mounted on the pawl carrying member and normally springheld in its innermost position with the side edge of its inner end in engagement with the side edge of the offset extension on the pawl member, means for moving the slide outwardly, resilient means for swinging the pawl member into such position that the clutch means thereon engages the inner peripheral surface of the casing upon the disengagement of the side edge of the inner end of the slide from the side edge of the offset extension, the end face of the offset extension then engaging the end face of the inner end of the slide, and means for restoring the pawl member to its initial position whereby the side edge of the offset extension again engages the side edge of the inner end of the slide.

7. In a power lift for plows, the combination with the axle and land wheel rotatably mounted thereon, of a pawl carrying member freely mounted on the axle, a pawl member pivoted on the pawl carrying member and having an offset extension, an outwardly extending pawl on the pawl member, an arm on the pawl member, a roller on said arm, a slide on the pawl carrying member normally springheld in its innermost position with its inner end in engagement with the offset extension, a casing mounted on the land wheel and coacting with the pawl carrying member, said casing having a plurality of indentures on its inner peripheral face, and a spring between the offset end of the pawl member and the pawl carrying member.

8. In a power lift for plows, the combination with the axle and land wheel rotatably mounted thereon, of a pawl carrying member freely mounted on the axle, a pawl member pivoted on the pawl carrying member and having an offset extension, an outwardly extending pawl on the pawl member, an arm on the pawl member, a roller on said arm, a slide on the pawl carrying member normally springheld in its innermost position with its inner end in engagement with the offset extension, a casing mounted on the land wheel and coacting with the pawl carrying member, said casing having a plurality of indentures on its inner peripheral face, a spring between the offset end of the pawl member and the pawl carrying member, a hooked outer end on the slide, and a pivoted lever, one end adapted to engage the hooked end of the slide and upon rotation of the pawl carrying member engaging the pawl on the pawl member.

9. In a power lift for plows, the combination with the axle and land wheel rotatably mounted thereon, of a pawl carrying member freely mounted on the axle, a pawl member pivoted on the pawl carrying member and having an offset extension, an outwardly extending pawl on the pawl member, an arm on the pawl member, a roller on said arm, a slide on the pawl carrying member normally springheld in its innermost position with its inner end in engagement with the offset extension, a casing mounted on the land wheel and coacting with the pawl carrying member, said casing having a plurality of indentures on its inner peripheral face, a spring between the offset end of the pawl member and the pawl carrying member, a hooked outer end on the slide, a pivoted lever, one end adapted to engage the hooked end of the slide and upon rotation of the pawl carrying member engaging the pawl on the pawl member, an outwardly extending stop on the pawl carrying member normally engaging the lever, and an eccentrically disposed web on the pawl carrying member with a lever end receiving indenture therein.

EDWARD ARTHUR HUTCHINSON.